June 16, 1936.  G. A. KLIMEK  2,044,172
POWER TRANSMITTER
Filed Dec. 13, 1934  3 Sheets-Sheet 1

INVENTOR
Gustav A. Klimek
BY
Hoguet, Neary & Campbell
ATTORNEYS

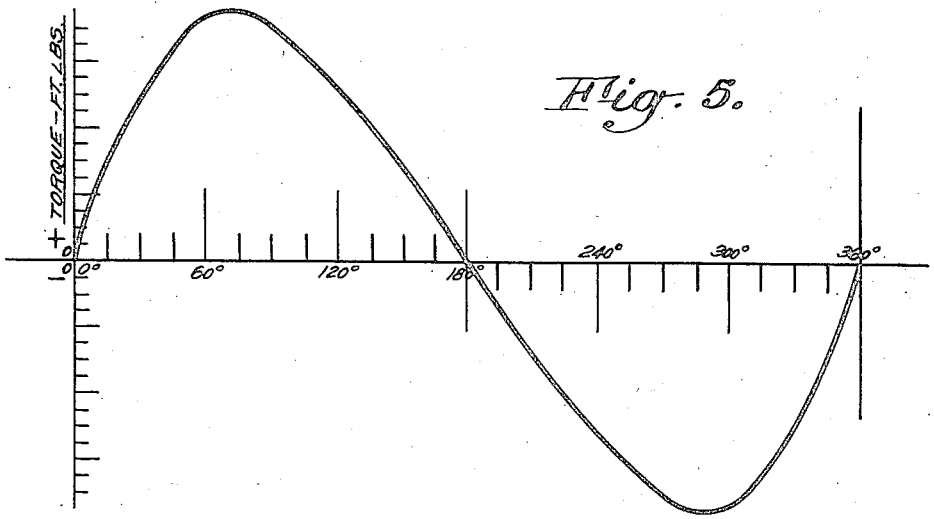
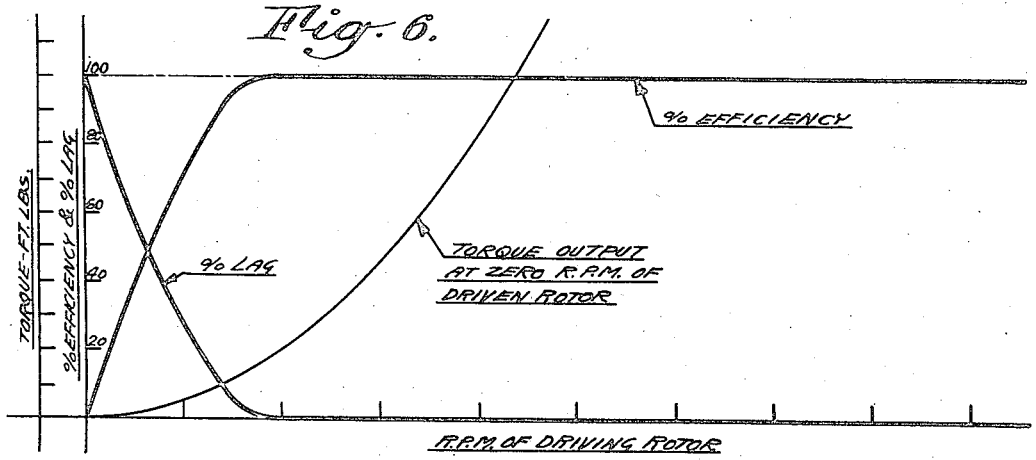
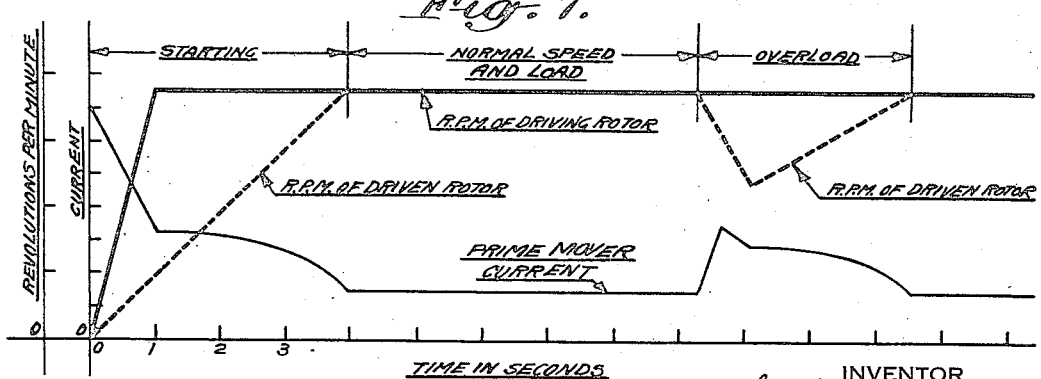

Patented June 16, 1936

2,044,172

UNITED STATES PATENT OFFICE 2,044,172

POWER TRANSMITTER

Gustav A. Klimek, East Rutherford, N. J., assignor to Diehl Corporation, New York, N. Y., a corporation of New York Application December 13, 1934, Serial No. 757,293

9 Claims. (Cl. 74—64)

In a copending application filed by the present applicant on July 25, 1934, Serial No. 736,876 there is disclosed and claimed a torque converter having certain distinctive and desirable characteristics. The present invention relates to a device in which the same general principle of power transmission is employed but which is peculiarly adapted for service under conditions where all of the characteristics of the device shown in the copending application are not required. The elimination of such unnecessary characteristics is accomplished through the omission of several elements whose presence is necessary for their accomplishment. The improved device, therefore, is of simpler construction, more compact, of fewer parts, cheaper, easier to assemble and disassemble and operative without the presence of reactance means such as a hydraulic medium or the equivalent. However, the improved power transmitter retains the fundamental advantages and characteristics of the device disclosed in said copending application in that it permits the use of a prime mover with low starting torque characteristics and automatically compensates for stresses impressed by sudden over-loads. Further, the improved power transmitter functions smoothly and quietly under all conditions of operation and eliminates surging as is commonly experienced in power transmitters now in use.

In accordance with the invention it is proposed to provide a power transmitter comprising generally a driving and driven rotor and operatively interposed impellers, the driving rotor being engaged with the prime mover and the driven rotor being engaged with the driven member. The improved unit is so constructed that it is reversible in that the driven rotor may become the driving rotor and the driving rotor the driven rotor as conditions may require.

The invention will be described with greater particularity in connection with the embodiment illustrated in the accompanying drawings, wherein:

Figures 5–7 are curves showing the characteristics of the improved power transmitter in operation.

Figure 4:
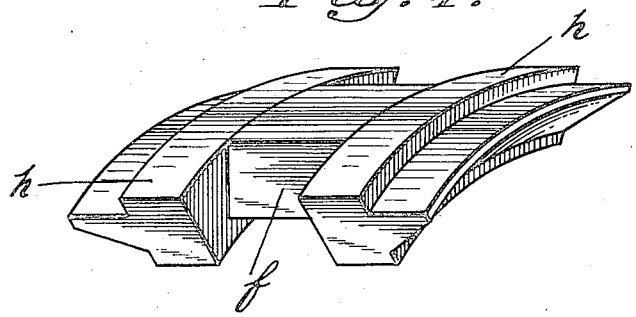
Figure 4 is a perspective view of one of the guide blocks of the impellers.

The embodiment shown in the accompanying drawings is one in which the casing of the unit is of such form as to constitute a pulley for engagement by a driving belt which may derive its power from a suitable prime mover. The invention is not limited, of course, to the form of the casing nor to the means by which the driving element of the unit receives its power, the function of the devices being merely to transmit power from a driving element to an element to be driven. As shown in the drawings the casing of the unit comprises a circular wall $a$ to which is secured circular end walls $b$, $c$, the over-all diameter of the end walls being greater in the illustrated embodiment than the diameter of the circular wall $a$ in order to form exteriorly a groove for engagement, for instance, with a driving belt. Screws $d$ secure the end walls to the circular wall. Mounted within the casing thus formed is a driven member having an extended hub $e$ through which may pass a shaft to be driven, it being understood that the hub of the driven element can be keyed to the said driven shaft as will be apparent. The driven element of the improved unit may be regarded as the secondary rotor and has radially extending spaced guide members $e'$ with plain opposed guide faces disposed in pairs about the axis of rotation. Within the radially extending guideways thus formed by the pairs of opposed members $e'$ are disposed impeller blocks $f$ which are free to reciprocate radially within the respective guideways. Each block $f$ has extending therethrough a trunnion pin $g$, the opposite ends of which extend beyond the end faces, respectively, of the block. On the ends of each trunnion pin are supported pivotal guide blocks $h$, the general form of which is best illustrated in Figure 4. Figure 4 also shows clearly the relationship between each block $f$ and the guide block $h$ which are pivotally supported at each side thereof.

Figure 3:
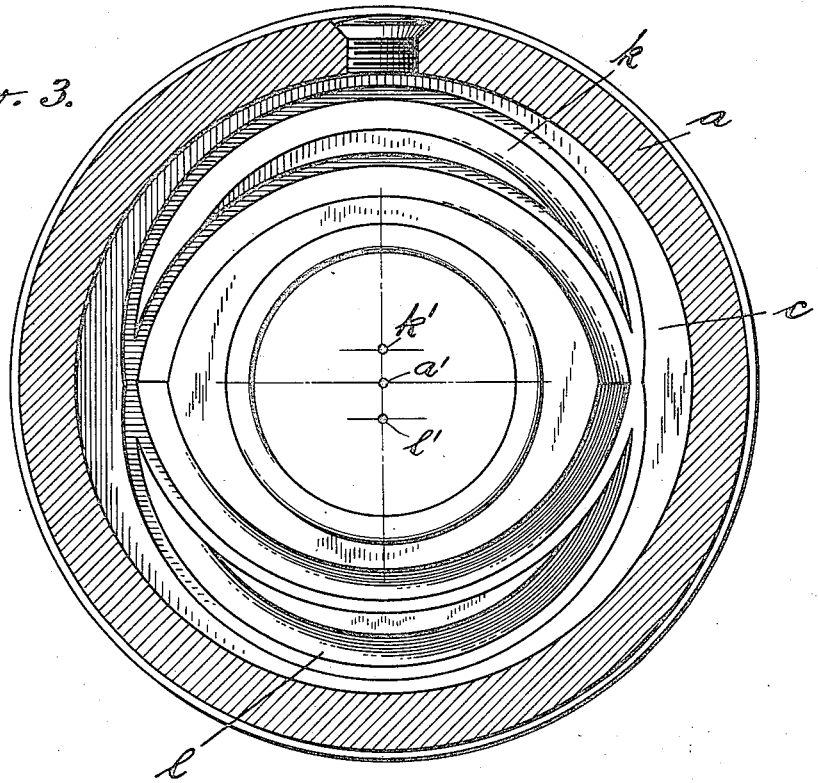
Figure 3 is a view in transverse section through the unit shown in Figure 1 and taken adjacent to one of the end walls of the casing to show the guide grooves for the impellers, the view being taken on the plane indicated by the line 3—3 of Figure 1 and looking in the direction of the arrows.

Before describing the assembly in greater detail reference is to be had to Figure 3 for an understanding of the guide tracks for the guide blocks which tracks are formed in the end walls $b$, $c$, and are, of course, similar and opposed. An understanding of the tracks in the end wall c illustrated in Figure 3 will make it clear that similar guide tracks opposed thereto are to be found in the other wall b. One of the guide blocks h of each block f engages the guide tracks in the wall c while its mate at the other side of the guide block f engages the track in the other wall b. It is further to be understood that the guideways formed by the members e' are arranged around the axis of the unit in diametrically opposed relationship and that each block in one guideway has a similar block disposed in the diametrically opposed guideway. The pairs of blocks are thus kept in static and dynamic balance at all times. However, the two blocks of a diametrically opposed pair are not engaged operatively with the same tracks in the end walls but with a different track, there being two distinct tracks formed in the end walls so that the opposed blocks may be caused to reciprocate without interference. One of the grooves constituting a track is indicated at k and is struck off from a center indicated at k'. The track itself is circular. A second track is indicated at l and is struck off from a center indicated at l', the two tracks, of course, intersecting. The centers k' and l' are disposed at diametrically opposite points equidistant from the axis i' of the unit, the consequence being that the tracks are eccentric to one another and to the casing a. The two circular tracks are of equal radii. As indicated hereinbefore, the guide block h of one block f may be assumed to engage the track k while the diametrically opposed block f' will be engaged operatively through its guide block h' with the other track l. Such blocks will also be engaged operatively, of course, with the similar tracks formed in opposed relation on the inner face of the other end wall b.

Rotation of the casing a will, through the engagement of the several blocks with the tracks in the end walls b, c, cause synchronous reciprocation of the several opposed blocks f, f' in their respective guide members e' and force components will be impressed on the parallel faces of such guide pieces e' to cause rotation of the secondary rotor member e and the element with which it is engaged. Lubrication of the interengaging parts may be provided by inserting oil within the casing and suitable closures, as indicated at m, of conventional form will prevent the escape of the lubricant. An opening $a^2$ in the circular wall may be provided to introduce the lubricant and closed by a screw cap $a^3$. It will be noticed that the end walls b, c, are formed with central openings to receive the hub e and have inwardly extending circular flanges b', c', respectively, which bear on the hub e of the secondary rotor. The primary and secondary members, of course, have differential rotation except during normal operation so ample peripheral channels $e^2$ in the hub e and communicating oil ports $b^2$, $c^2$, in the respective circular flanges b', c', are provided to insure a constant and ample flow of oil. Laterally extending channels $e^3$ in the hub e communicate through ports $e^4$ with the guideways in which reciprocate blocks f, to insure complete lubrication throughout.

The blocks h on the trunnions g are urged yieldingly into their respective tracks by compression springs o interposed operatively between the pins and the blocks, respectively.

From the description given it will be appreciated that the improved power transmitter is characterized by fewness of parts, ruggedness of construction, ease of assembly and certainty of operation. The principle of operation is fully set forth in the copending case and need not be repeated here. Suffice it to say that the eccentric circular tracks are so related to the radially disposed guideways, that the radial paths which the guide blocks are constrained to follow, coupled with the eccentric travel of the guide blocks pivoted thereon, impress circumferential components of force which cause the secondary rotor to rotate. Centrifugal force impressed on the moving blocks is the potent factor.

Figure 5 illustrates a torque curve of one of the blocks f through a planetary movement of 360° about the axis a' of the unit. From this curve it will be evident that the torque impressed on the driven member increases to maximum and then decreases until after a planetary movement of 180° about the axis of the unit the component of force impressed by the particular block on the driven member actually opposes continued rotation thereof. Figure 6 shows that the torque curve of the transmitter rises as the speed of the driving rotor increases at the same time that the efficiency of transmission rises. The relative increase of efficiency is inversely proportional to the decrease in the lag of the driven rotor with respect to the driving rotor, the efficiency becoming 100% when the driving and driven rotors move in unison. As a matter of fact, the driving rotor may be brought to speed by the prime mover with uniform acceleration while the driven rotor remains stationary, the torque curve of the driving rotor building up meanwhile to a point where it is sufficient to start rotation of the driven rotor. In Figure 7 the curve of the driving rotor is plotted to show its performance in contrast with the performance of the driven rotor during the starting period of, say, four seconds. It will be apparent that the driving rotor is brought up to speed in one second while the driven rotor lags appreciably, the two rotating together at the end of four seconds. This curve also shows the compensation afforded for sudden stresses caused by overload or shocks and impacts. The driven rotor is free to lag at any time under such circumstances, the rotation of the driving rotor continuing uniformly until, upon removal of such overload or stress the driven rotor again is brought up to the speed of the driving rotor. Viewing the performance of the transmitter in relation to the power consumption of the prime mover the so-called "current" curve in Figure 7 is revealing. This curve represents the power required to rotate the prime mover. It is greatest at the time of starting and falls off until it reaches a minimum when the primary rotor and secondary rotor are brought to the same speed. In case of overload or stress arising from shock impressed on the secondary rotor, this rotor lags freely as pointed out before. In order to restore the two members to rotation in unison additional power for the prime mover is drawn on as indicated in the curve.

The description makes it clear that the transmitter permits the use of a prime mover which may attain full speed with a minimum load, the operation being free from any tendency to jerk or grab. During operation overloads are compensated for and vibrations cushioned and diffused. The overload itself is limited and the prime mover and transmitting unit protected against injury. The prime mover is allowed to attain top speed with uniform acceleration free from the danger of stalling. Since the impellers are constrained to follow predetermined paths in their movements hunting and surging are eliminated. This is a marked improvement over known devices for the same purpose where the impellers are relatively free and tend to hunt or surge under load variations. The unit itself is of simple, compact and durable construction. Its operation is smooth and quiet, the parts being in perfect balance and adequately lubricated. It is evident that power may be applied to either one of the rotors for transmission to the other. This reversible character is of practical importance in use. With such a reversal there is no loss of efficiency or capacity. It has also been made clear that no limitation is to be imposed as to the form or character of the unit or the means for connecting either one of the rotors to their respective associated members. While the housing has been illustrated for convenience as taking the form of a pulley it is obvious that it might be driven as a gear member or some other form of connection with the associated element might be employed. The unit is also adaptable for use as a coupling in straight line power transmission and may be designed for association with a universal connection under such conditions as to compensate for disalignment of two connected shafts. Other uses of the unit may be found but are not to be regarded as departures from the invention where the principle of operation is retained.

Figure 1:
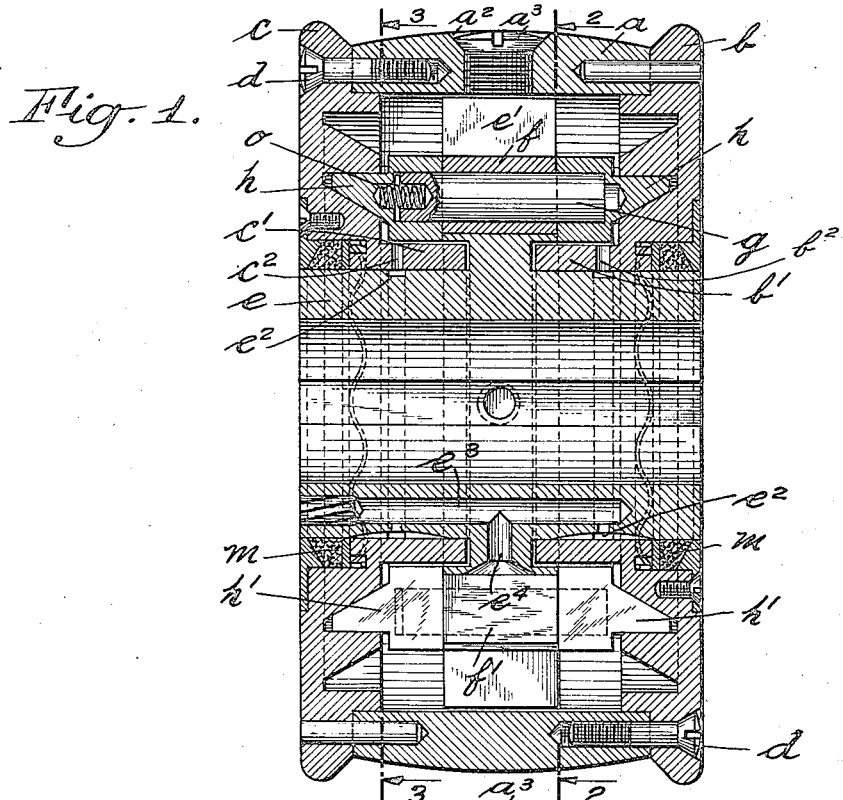
Figure 1 is a view in vertical section taken through the axis of the rotors.
Figure 2:
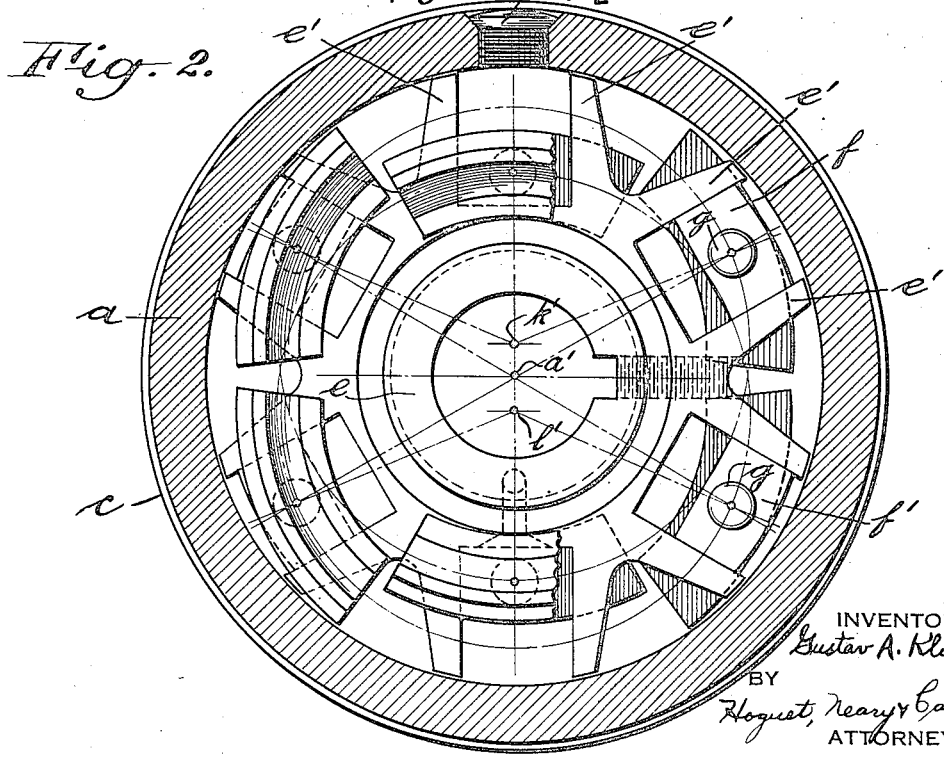
Figure 2 is a view in transverse section through the unit shown in Figure 1 and taken on the plane indicated by the line 2—2 of Figure 1 and looking in the direction of the arrows, some of the impeller guide blocks being shown in place and others removed.

Referring now to Figure 1 particularly for an understanding of one important structural improvement it will be seen that the blocks $h$ have one face beveled and that the tracks in which these blocks run are similarly formed. The blocks $f$, of course, normally tend to move outwardly under the impress of centrifugal force. This outward movement is resisted by the engagement of the guide blocks $h$ with the respective tracks. The bearing surface of the track and the blocks extends parallel to the axis of the unit while the opposite faces are beveled or inclined. This results in two important advantages. As seen in Figure 3, for instance, by inclining one wall of the tracks the points of intersection form interruptions of less extent than would be the case if both walls of the track were parallel to the axis of rotation. By reducing the gaps at these points of intersection a more continuous bearing surface for the blocks is afforded so there is less likelihood of undue wear and noise. Another advantage of providing the tracks with an inclined wall and beveling one side of the blocks is that the springs $o$ will urge the blocks into seating engagement with the tracks at all times despite wear.

I claim as my invention:

1. A power transmitter comprising in combination a first rotor, a second rotor, impellers operatively interposed between said rotors, circular grooves in one of said rotors forming tracks disposed eccentrically to the axis thereof and engaged with the impellers to cause them to move in a predetermined orbital path during the transmission of power from either of the rotors to the other and radial guideways engaging said impellers to cause them to reciprocate along a radial path during said orbital movement.

2. A power transmitter comprising in combination a driving rotor, a driven rotor, impellers operatively interposed between said rotors, said impellers comprising radially reciprocable blocks and guide blocks pivotally mounted on said reciprocable blocks, circular paths in one of said rotors eccentric to the axis thereof and engaged by said guide blocks and radially extending guideways on the other of said rotors in which said first named blocks are reciprocable.

3. A power transmitter comprising in combination a rotor casing having a central opening therethrough, the end walls of the casing having inwardly extending circular flanges defining said opening, a second rotor having a hub disposed within said opening and with which said flanges engage and having inwardly extending radial guideways disposed within the casing, impeller members operatively engaged with the casing and with said guideways and mounted for reciprocation within said guideways, and means formed within the casing and engaging said impellers to cause them to move in a circular path upon rotation of the rotors in either direction while reciprocating in said guideways.

4. A power transmitter comprising in combination a rotor casing having a central opening therethrough, the end walls of the casing having inwardly extending circular flanges defining said opening, a second rotor having a hub disposed within said opening and with which said flanges engage and having inwardly extending radial guideways disposed within the casing, impeller members operatively engaged with the casing and with said guideways and mounted for reciprocation within said guideways, means formed within the casing and engaging said impellers to cause them to move in a circular path upon rotation of the rotors in either direction while reciprocating in said guideways, and means to retain a lubricant within said casing for the relatively movable elements.

5. In a power transmitter impeller blocks mounted for radial reciprocation and having trunnion pins extending laterally therethrough, guide blocks mounted pivotally on the ends of said trunnion pins, and means engaging the guide blocks to direct them in circular orbital paths during reciprocation of the impeller blocks.

6. In a power transmitter impeller blocks mounted for radial reciprocation and having trunnion pins extending laterally therethrough, guide blocks mounted pivotally on the ends of said trunnion pins, means engaging the guide blocks to direct them in orbital paths during reciprocation of the impeller blocks, and yielding means carried with the trunnion pins and engaging said guide blocks to maintain them in operative engagement with said last named means.

7. A power transmitter comprising in combination a driving rotor, a driven rotor, impellers operatively interposed between said rotors, said impellers comprising radially reciprocable blocks and guide blocks pivotally mounted on said reciprocable blocks, guide tracks engaged by said guide blocks, said guide blocks having relatively inclined faces and said guide tracks being of similar cross sectional form.

8. A power transmitter comprising in combination a driving rotor, a driven rotor, impeller operatively interposed between said rotors, said impellers comprising radially reciprocable blocks and guide blocks pivotally mounted on said reciprocable blocks, guide tracks engaged by said guide blocks, said guide blocks having relatively inclined faces, said guide tracks being of similar cross sectional form, and means to urge said faces of the guide blocks in engagement with said guide tracks.

9. A power transmitter comprising in combination a driving rotor, a driven rotor, impellers operatively interposed between said rotors, said impellers comprising radially reciprocable blocks and guide blocks pivotally mounted on said reciprocable blocks, circular paths in one of said rotors eccentric to the axis thereof, the side wall of said circular path nearest to the axis of rotation being inclined, and the engaging surface of the guide blocks being beveled to conform to the inclined wall of the said paths, and radially extending guideways on the other of said rotors in which said first named blocks are reciprocable.

GUSTAV A. KLIMEK.